（12）United States Patent
Nashner et al.

(10) Patent No.: US 9,568,167 B2
(45) Date of Patent: *Feb. 14, 2017

(54) PRODUCTS WITH A PATTERNED LIGHT-TRANSMISSIVE PORTION

(71) Applicant: Electro Scientific Industries, Inc., Portland, OR (US)

(72) Inventors: Michael S. Nashner, Portland, OR (US); Jeffrey Howerton, Portland, OR (US); Weixiong Lu, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 705 days.

This patent is subject to a terminal disclaimer.

(21) Appl. No.: 13/797,891

(22) Filed: Mar. 12, 2013

(65) Prior Publication Data

US 2013/0223044 A1  Aug. 29, 2013

Related U.S. Application Data

(62) Division of application No. 11/742,862, filed on May 1, 2007, now Pat. No. 8,394,301.

(Continued)

(51) Int. Cl.
*F21V 11/14* (2006.01)
*B08B 9/00* (2006.01)
(Continued)

(52) U.S. Cl.
CPC ............... *F21V 11/14* (2013.01); *B08B 9/00* (2013.01); *B23K 26/382* (2015.10); *B23K 26/40* (2013.01);
(Continued)

(58) Field of Classification Search
CPC . B23K 26/381; B23K 26/402; B23K 26/4065; B23K 2203/10; B23K 2201/34; F21V 11/14; B08B 9/00; G02B 6/04; G09F 13/04
See application file for complete search history.

(56) References Cited

U.S. PATENT DOCUMENTS 3,440,368 A * 4/1969 Golden ................ H01H 43/12
200/38 B
3,440,388 A   4/1969 Ostot et al.
(Continued)

FOREIGN PATENT DOCUMENTS

JP   H02089740 U   7/1990
JP   H07016778 A   1/1995
(Continued)

OTHER PUBLICATIONS

Prichystal, et al, Invisible Display in Aluminum (Invited Paper); SPIE 5713, Photon Processing in Microelectronics and Photonics IV, 215 (May 5, 2005); doi: 10.1117/12.602043 (Abstract Only).

*Primary Examiner* — Mathieu Vargot
(74) *Attorney, Agent, or Firm* — Young Basile Hanlon & MacFarlane, P.C.

(57) ABSTRACT

A panel with an optically transmissive portion includes a group of holes drilled from one surface to another surface and filled with an optically transmissive material. The group of holes forms a pattern. The holes on a first surface form a smooth and continuous appearance to the naked eye. The holes on the other, second surface are sized so that a light source directed to the second surface illuminates the pattern to be visible to a viewer viewing the first surface. The panel may form a portion of a housing that houses the light source.

9 Claims, 6 Drawing Sheets

Related U.S. Application Data

(60) Provisional application No. 60/810,380, filed on Jun. 2, 2006.

(51) Int. Cl.
*G09F 13/04* (2006.01)
*B23K 26/40* (2014.01)
*G02B 6/04* (2006.01)

(52) U.S. Cl.
CPC ............. *B23K 26/402* (2013.01); *G09F 13/04* (2013.01); *B23K 2201/34* (2013.01); *B23K 2203/10* (2013.01); *B23K 2203/42* (2015.10); *B23K 2203/50* (2015.10); *G02B 6/04* (2013.01)

(56) References Cited

U.S. PATENT DOCUMENTS

| | | | |
|---|---|---|---|
| 4,155,972 | A | 5/1979 | Hauser et al. |
| 4,608,480 | A | 8/1986 | Bizot et al. |
| 4,791,746 | A | 12/1988 | Coronato |
| 5,632,914 | A | 5/1997 | Hagenow et al. |
| 5,641,221 | A | 6/1997 | Schindele et al. |
| 5,744,776 | A | 4/1998 | Bauer |
| 5,790,151 | A | 8/1998 | Mills |
| 5,951,349 | A | 9/1999 | Larose et al. |
| 6,211,485 | B1 | 4/2001 | Burgess |
| 6,400,172 | B1 | 6/2002 | Akram et al. |
| 6,416,844 | B1 | 7/2002 | Robson |
| 6,652,128 | B2 | 11/2003 | Misaras |
| 6,664,489 | B2 | 12/2003 | Kleinhans et al. |
| 7,057,133 | B2 | 6/2006 | Lei et al. |
| 7,081,405 | B2 | 7/2006 | Chien |
| 7,201,508 | B2 | 4/2007 | Misaras |
| 7,230,278 | B2 | 6/2007 | Yamada et al. |
| 7,663,612 | B2 | 2/2010 | Bladt |
| 7,880,131 | B2 | 2/2011 | Andre et al. |
| 7,884,315 | B2 | 2/2011 | Andre et al. |
| 7,968,820 | B2 | 6/2011 | Hardy et al. |
| 8,450,640 | B2 * | 5/2013 | Hardy ................ B23K 26/4065 219/121.71 |
| 2002/0170891 | A1 | 11/2002 | Boyle et al. |
| 2004/0032659 | A1 | 2/2004 | Drinkwater |
| 2004/0128882 | A1 | 7/2004 | Glass |
| 2004/0247935 | A1 * | 12/2004 | Bladt ...................... G09F 13/04 428/690 |
| 2005/0061787 | A1 | 3/2005 | Byrd et al. |
| 2005/0127478 | A1 | 6/2005 | Hiatt et al. |
| 2006/0066579 | A1 * | 3/2006 | Bladt ...................... G09F 9/305 345/173 |
| 2007/0042527 | A1 | 2/2007 | Tuckerman et al. |
| 2007/0138644 | A1 | 6/2007 | McWilliams et al. |
| 2007/0291496 | A1 | 12/2007 | Nashner et al. |
| 2009/0242528 | A1 | 10/2009 | Howerton et al. |
| 2010/0012506 | A1 | 1/2010 | Prichystal |
| 2010/0044092 | A1 | 2/2010 | Simenson et al. |

FOREIGN PATENT DOCUMENTS

| | | | |
|---|---|---|---|
| JP | 7-201260 | * | 8/1995 |
| JP | H07201260 | A | 8/1995 |
| JP | H07271309 | A | 10/1995 |
| JP | H08298043 | A | 11/1996 |
| JP | H11168281 | A | 6/1999 |
| JP | 2003248445 | A | 9/2003 |
| JP | 2004104079 | A | 4/2004 |
| JP | 2005066687 | A | 3/2005 |
| JP | 2005507318 | A | 3/2005 |
| JP | 2006062431 | A | 3/2006 |
| TW | 200624238 | A | 7/2006 |
| TW | I277830 | B | 4/2007 |
| WO | 2004077388 | A1 | 9/2004 |
| WO | 2005110666 | A1 | 11/2005 |

* cited by examiner

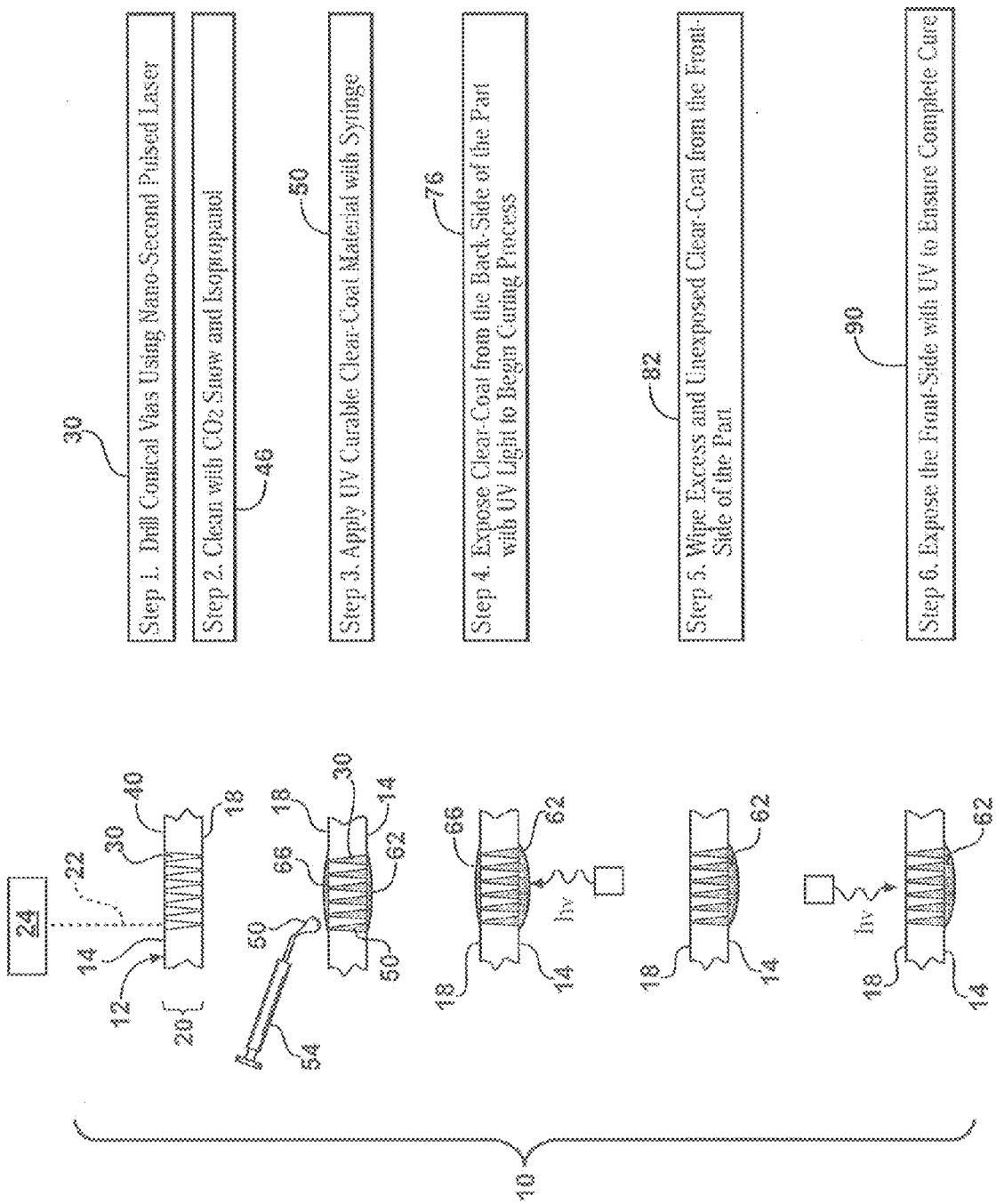

PRODUCTS WITH A PATTERNED LIGHT-TRANSMISSIVE PORTION

CROSS-REFERENCE TO RELATED APPLICATIONS

This application is a division of U.S. application Ser. No. 11/742,862, filed May 1, 2007, now U.S. Pat. No. 8,394,301, which claims the benefit of U.S. Provisional Application No. 60/810,380, filed Jun. 2, 2006, each of which is incorporated herein in its entirety by reference.

FIELD OF THE DISCLOSURE

The disclosure herein relates to products with a patterned light-transmissive portion, such as a panel and/or housing with a patterned light-transmissive portion.

BACKGROUND

Projecting a light through a housing to provide information is commonplace. Examples include but are not limited to computer keyboards that include indication lights for functions such as "Caps Lock" or "Num Lock"; computer monitors that include an "on/off" light automobiles that include lights to indicate whether heated seats are on or off, or whether an air bag is on or off; televisions with indicator lights, and a whole host of other consumer electronics.

A common way to provide for such lighting is to provide a projecting light that is visible when the light is off and brightly lit to indicate when the light is on. A collection of lights, or holes for lights, may be disruptive to the objectives of an industrial designer.

SUMMARY

Disclosed are methods for forming a display in a relatively thin substrate or panel with a material that permits the transmission of light through microholes filled with a transparent filler material and products that are made by such methods.

One apparatus described herein includes a panel having a first external surface and an opposite, second external surface, wherein a material of the panel is non-transmissive to light, a pattern of microscopic holes drilled through at least a portion of the panel, wherein openings of the microscopic holes are sized such that light applied to the second external surface illuminates the pattern on the first external surface and the first external surface forms a continuous panel surface to the naked eye when light is not applied to the second external surface, and a light transmissive material filling the microscopic holes.

BRIEF DESCRIPTION OF THE DRAWINGS

The description herein makes reference to the accompanying drawings wherein like reference numerals refer to like parts throughout the several views, and wherein:

FIG. 1 is a schematic representation of the sequence of method of the present disclosure;

DETAILED DESCRIPTION OF EMBODIMENTS OF THE INVENTION

Figure 3:
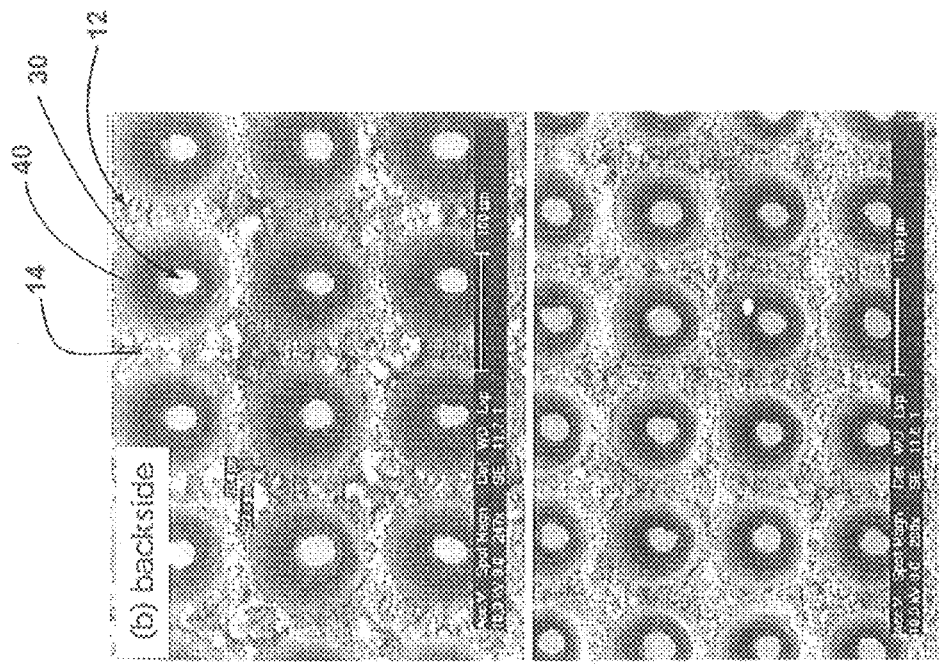
FIG. 3 are SEM micrographs taken of a panel having conically-shaped vias showing the first or back side of a panel with the larger via opening.
Figure 2:
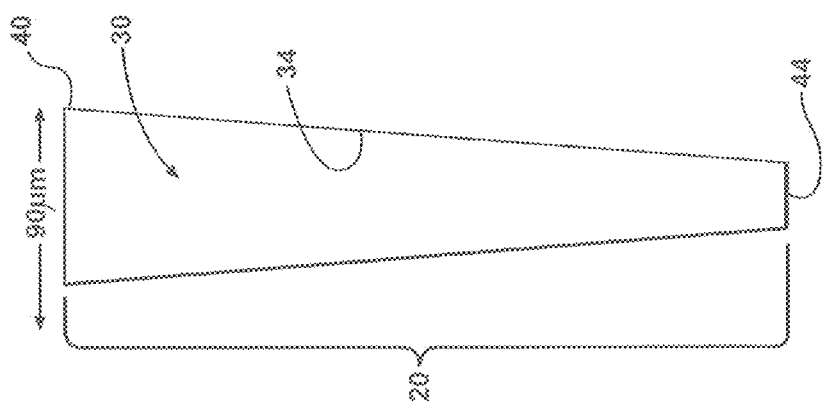
FIG. 2 is a schematic representation of a conically-shaped via or hole geometry.
Figure 5:
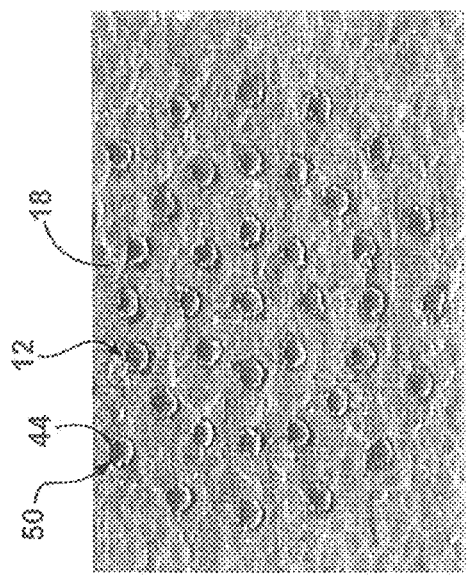
FIG. 5. is a SEM micrograph of the visible side of the panel having the smaller opening of the exemplary vias with the filler material in the vias.
Figure 6:
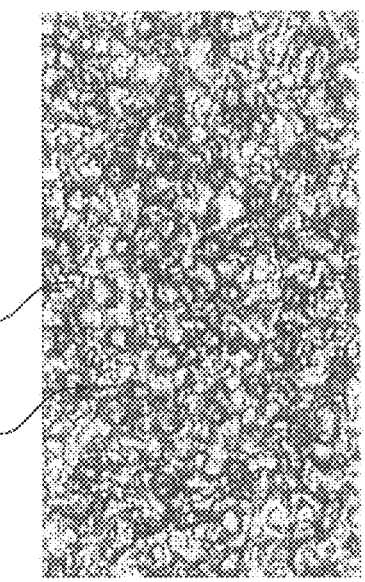
FIG. 6. is an optical micrograph of the visible side of the panel having the exemplary vias filled with the filler material and having backlighting to show transmission of light through the conical vias as viewed from the visible side of the panel.
Figure 4:
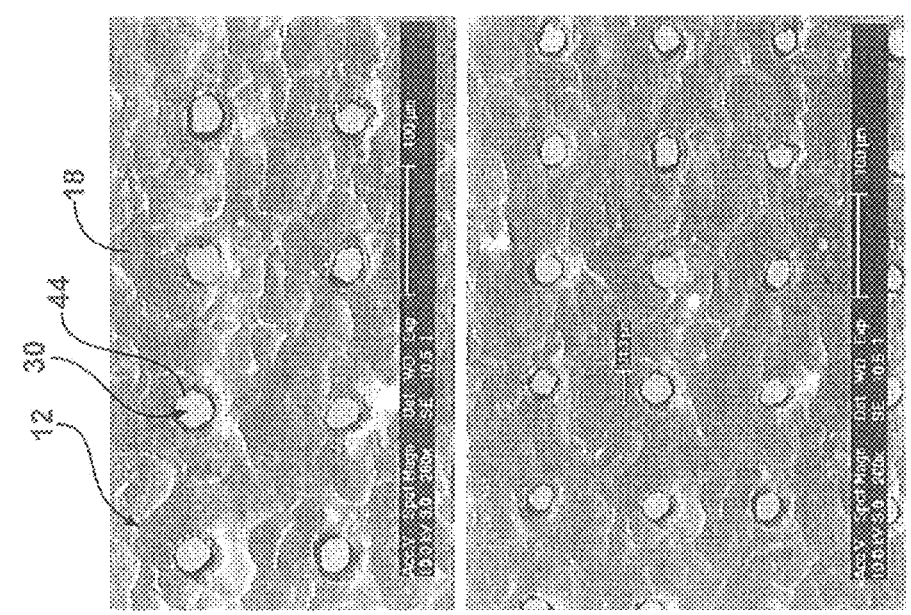
FIG. 4 are SEM micrographs of vias showing the second or visible side of the panel having the smaller opening of the conical via.
Figure 7:
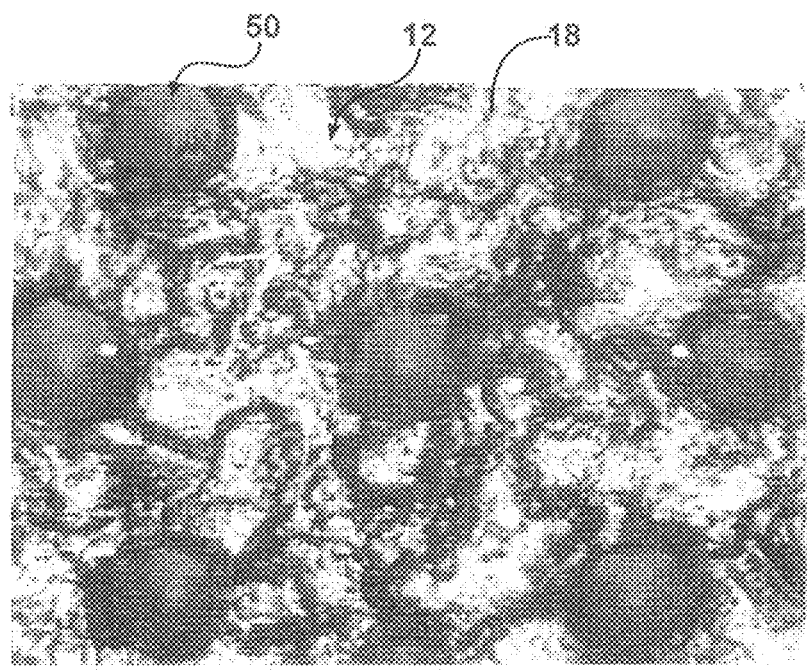
FIG. 7 is an enlarged optical micrograph of the visible side of the panel shown in FIG. 6.

Referring to FIGS. 1-18, methods for filling at least one via with a light transmissive material are shown and described below. FIG. 19 illustrates a product resulting from one of the methods. The disclosure utilizes via drilling techniques to create a micro via that is then filled with a light transmissive material. Via drilling is known in the unrelated field of electronics manufacturing. Vias are created in multi-layered interconnected substrates and lined with a conductor, such as copper, to permit an electrical connection between different layers in a circuit.

A method 10 and steps for filling a via with light transmissive material are illustrated in FIG. 1. A panel or substrate 12 is provided. Panel 12 as shown is a relatively thin continuous sheet of material. Panel 12 includes a first or back side 14 and an opposing second or front side 18 defining a panel thickness 20. Front side 18 is relatively smooth and substantially unbroken to the naked eye. Panel 12 may be made from anodized aluminum or other materials known to those skilled in the art.

The method 10 includes drilling one or a plurality of micro-vias or holes 30 through the panel 12. As shown in FIGS. 2-4, 8 and 9, in one aspect of the method the vias 30 are conical-shaped having sidewalls 34 and a first opening 40 in panel first side 14 and an opposing second opening 44 on panel side 18. First via opening 40 is larger in diameter than second via opening 44. In one aspect, first via opening 40 is approximately 90-100 micrometers (μm) in diameter, and second via opening 44 is approximately 30-40 micrometers (μm) in diameter. It is understood that larger or smaller conical openings and other via shapes and configurations may be used.

The vias shown are drilled or machined out of the panel using a laser 24, such as a diode-pumped solid-state pulsed laser, in a circular or spiral pattern. It has been shown that a Nd:YAG 355 nm spot 22 with a pulse repetition rate of 30 kHz and ~60 nanosecond pulse width is useful in machining out the preferred conical-shaped vias 30. Drilling of the exemplary vias 30 is accomplished from back side 14 through panel 12 toward the front side 18. Other types of lasers with different characteristics and other machining processes from drilling vias known to those skilled in the art may be used to suit the particular application.

The method 10 optionally includes the step 46 of cleaning the drilled vias 30 to remove any debris or deposits formed during the machining process. It has been shown that a $CO_2$ snow jet cleaning and isopropyl are effective in cleaning the vias. Other via cleaning techniques known by those skilled in the art may also be used. For example, ultrasonic cleaning using, for example, ultrasonic baths may be used. Also, the application of high-pressure air, like the snow jet, may be made from a source movably located in a similar manner to the drill 24 to clean the vias.

Figure 8:
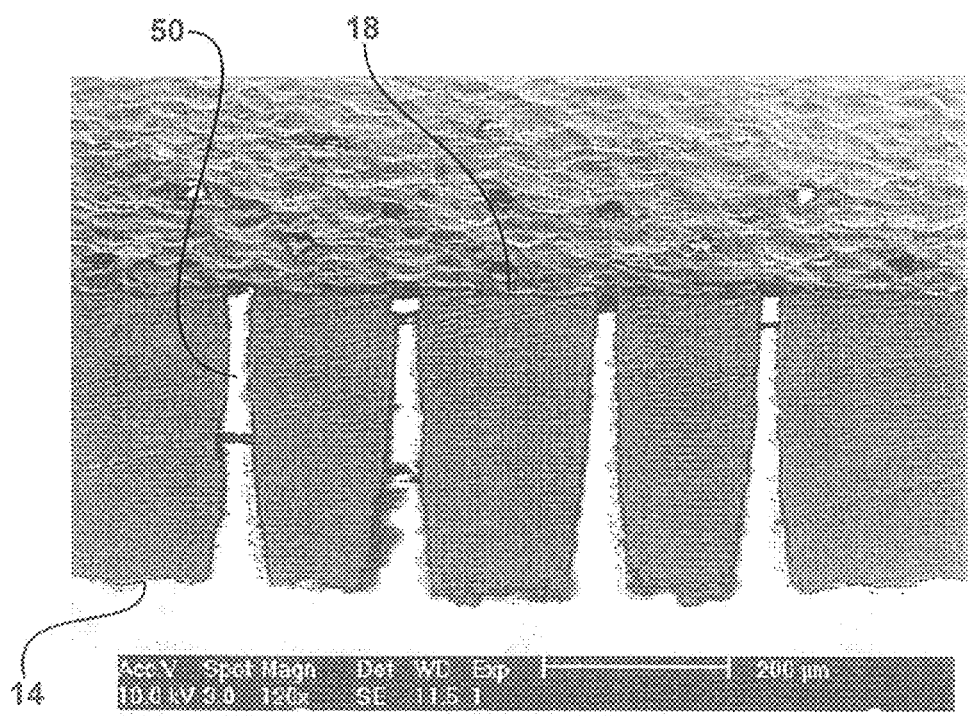
FIG. 8 is a SEM micrograph cross-section of several vias filled with the filler material.
Figure 9:
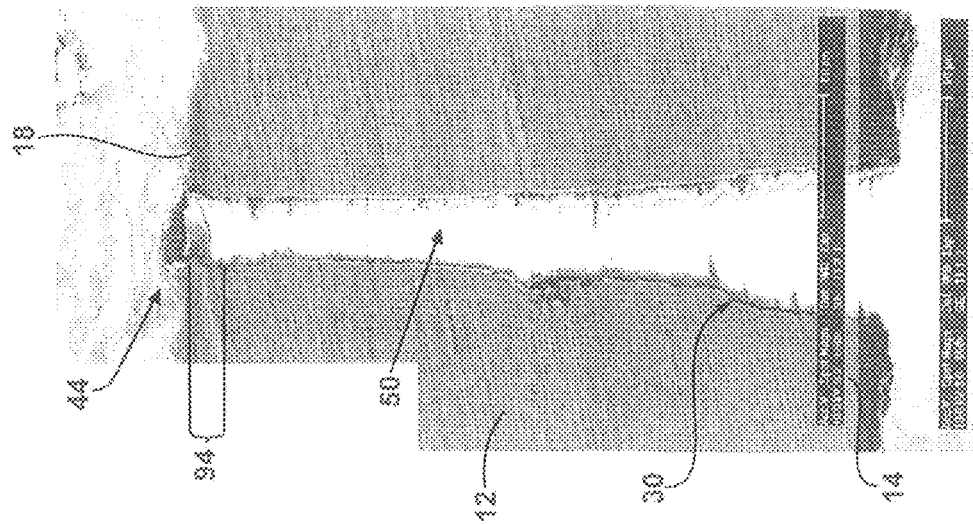
FIG. 9 is an enlarged SEM micrograph cross-section of a filled conical via shown in FIG. 8.

As shown in FIGS. 1 and 5-9, the method 10 includes applying a filler material coating 50 into the vias 30. The filler material 50 may be a visible light transmissive material. As illustrated, filler material 50 is an optically transparent ultraviolet (UV)-curable, acrylate polymer that is in a liquid phase at the time of application to panel 12. Other plastics or polymers with light transmissive properties may also be used. The exemplary UV curable filler material is substantially clear when cured. As best seen in FIG. 1, the filler material 50 can be applied to the panel second side 18 over the top of the second, optionally smaller openings 44, of vias 30. It has been observed that through the relatively low viscosity of the exemplary liquid phase filler material 50, the geometry of the conically-shaped vias 30 and the forces of gravity, the filler material 50 flows into and through the vias 30 from the second side 18 to the first side 14, effectively filling the vias 30 as best shown in FIGS. 1, 8 and 9. Excess filler material 50 may propagate on panel 12 second side 18 (shown as 66) and first side 14 (shown as 62) as best seen in FIG. 1. The filler material 50 as shown is applied with a syringe-type device 54. Other filler material 50 application devices and techniques known by those skilled in the art may be used. Examples include ink jet techniques and pad printing techniques.

In an alternate aspect, filler material 50 may be applied to back side 14 so the filler material 50 flows through via 30 from back side 14 toward front side 18 in a similar manner as described.

When a curable filter material is used, method 10 may include the step 76 of curing the exemplary liquid phase silica-based filler material 50 by exposing the filler 50 to UV light. Exposure to UV light 76 initiates free-radical polymerization of the silicate filler material 50 inside and through vias 30. In one method of applying the UV light, the UV light is applied to back side 14 and via 30 (i.e., the large openings 40) to promote curing of filler material 50 in vias 30. When cured, the exemplary filler material 50 is optically transparent permitting passage of visible light through the filler 50 and panel 12 through vias 30.

Method 10 includes the step 82 of removing any excess or uncured filler material deposits 66 from the panel visible, front side 18 as shown in FIG. 1. For example, filler excess deposits 66 may be removed from front side 18 through a simple isopropanol wipe, leaving a visibly smooth and clean surface. Other methods and techniques for removing excess deposits 66 may be used.

Method 10 may optionally include the step 90 of exposing the filler material 50 in vias 30 adjacent to the visible panel side 18 after the step of removing excess deposits 66 to assist curing of the filler material 50 throughout vias 30. Referring to FIG. 9, the filler material 50 most adjacent to the panel visible surface 18 may be slightly below front side 18 forming a recess 94 between the filler 50 and front side 18.

Figure 11:
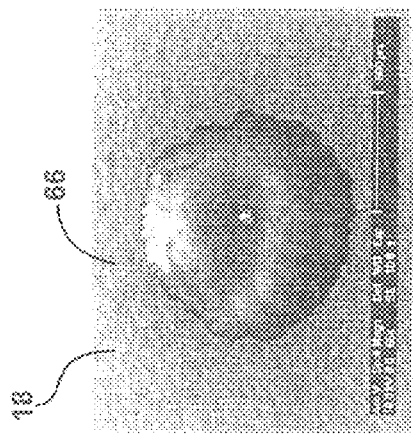
FIG. 11 is a SEM micrograph of the alternate filler material configuration shown in FIG. 10.
Figure 13:
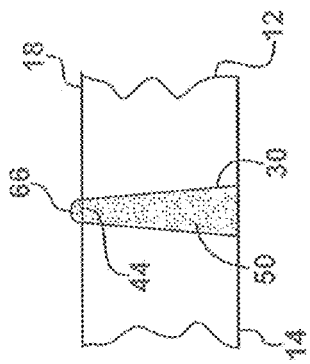
FIG. 13 is a schematic representation of an alternate configuration of the filler material on the visible side of the panel.
Figure 10:
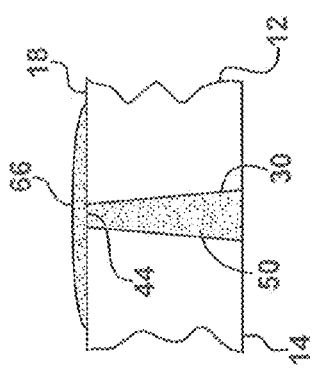
FIG. 10 is a schematic representation of an alternate configuration of the filler material on the visible side of the panel.
Figure 12:
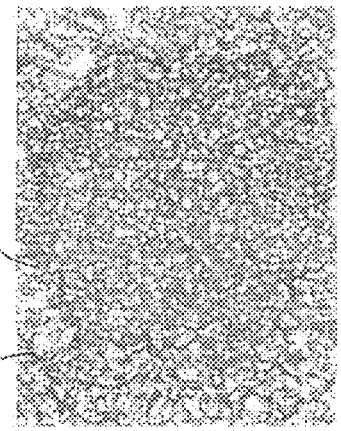
FIG. 12 is an optical micrograph of the alternate filler material configuration shown in FIG. 11.
Figure 14:
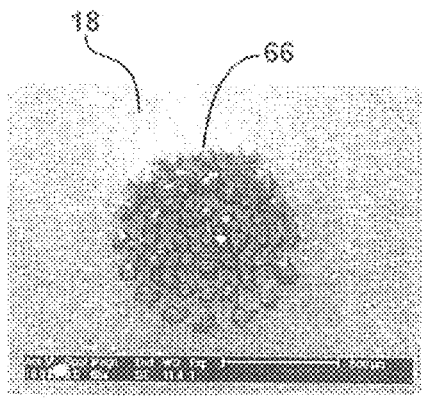
FIG. 14 is a SEM micrograph of the alternate filler material configuration shown in FIG. 12.
Figure 15:
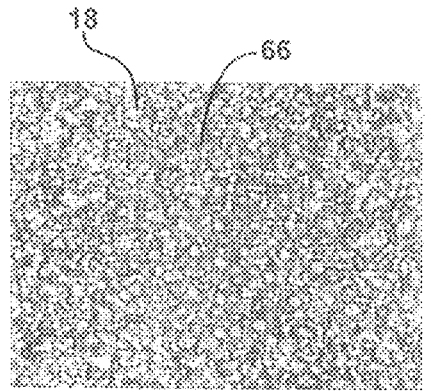
FIG. 15 is an optical micrograph of the alternate filler material configuration shown in FIG. 14.
Figure 16:
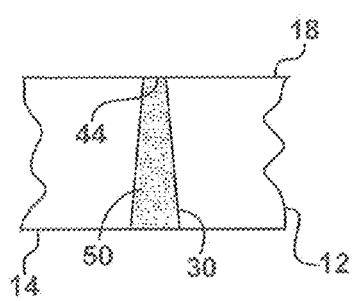
FIG. 16 is a schematic representation of an alternate configuration of the filler material on the visible side of the panel.
Figure 17:
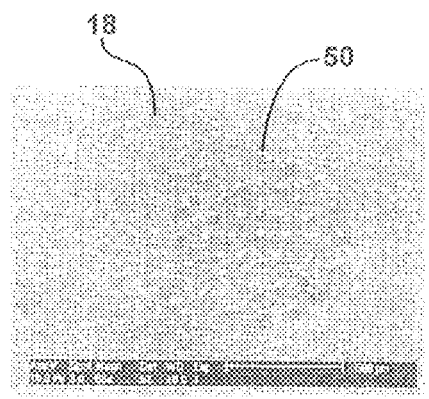
FIG. 17 is a SEM micrograph of the alternate filler material configuration shown in FIG. 16.
Figure 18:
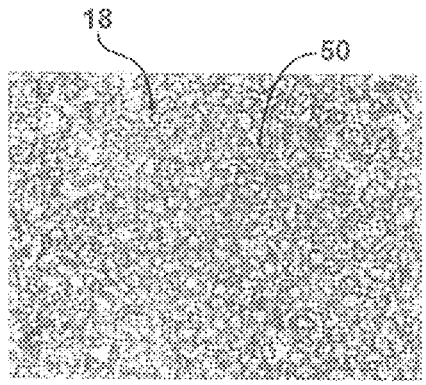
FIG. 18 is an optical micrograph of the alternate filler material configuration shown in FIG. 17.
Figure 19:
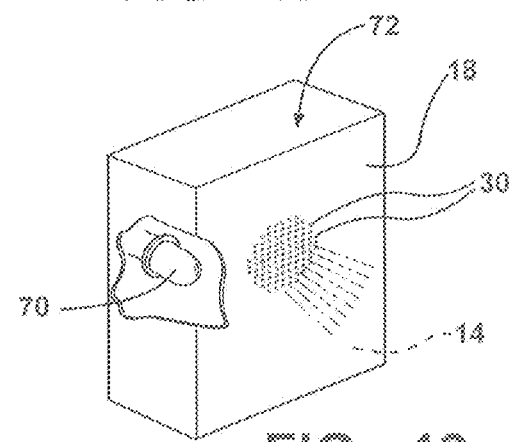
FIG. 19 is a schematic representation of a housing utilizing a light transmissive panel including filled vias.

As best seen in FIGS. 10-18, treatment of the filler material directly adjacent to the visible panel surface 18 may be varied to change or enhance the visual appearance of the filler material 40 and visible light passing therethrough for a user. In an alternate aspect of method 10, cured excess filler deposits 66 may take a convex shape or form as opposed to being recessed into vias 30 as shown in FIG. 9. For example, FIGS. 10-12 and FIGS. 13-15 illustrate two such convex forms for the cured excess filler deposits 66. In FIGS. 10-12, the convex shape extends beyond and surrounds the second via opening 44. In FIGS. 13-15, the convex shape is approximately limited to the area of the second via opening 44. Through different shapes or configurations, the visible light passing through the filler material 50 may be altered to produce a different visual appearance or effect to the user similar to altering the shape or configuration of a lens. As another example, FIGS. 16-18 illustrate, instead of a concave or convex shape, a flush fill, that is, an embodiment where the filler material 50 is flush with the surface of the second, or front, side 18.

The cured filler material 50 and front side 18 from the method 10 results in protected vias 30 capable of transmitting light through panel 12. The use of vias and an optically transparent filler material produces a smooth and continuous panel surface to the naked eye that is capable of displaying controlled images through the vias from interior illumination, as shown in FIG. 19. FIG. 19 illustrates a panel 12 including a back light 70, which may be an LED, fluorescent or incandescent light, or other lighting devices. Panel 12 may be a section inserted into a housing or may be an integral section of the housing 72 as shown in FIG. 19.

The resultant panel 12 can be used in all manner of applications including hand-held electronic devices, for example, MP3 players, computers, cellular phones, DVD players and the like. The disclosed method and resultant panel is applicable in virtually all applications where a visually continuous and uninterrupted panel surface is desired having the capability to produce illuminated messages, images or other perceptible characteristics for the user.

While the method has been described in connection with certain embodiments, it is to be understood that the method is not to be limited to the disclosed embodiments but, on the contrary, is intended to cover various modifications and equivalent steps and arrangements included within the scope of the invention and any appended claims.

What is claimed is:

1. An apparatus, comprising:
  a panel having a first external surface and an opposite, second external surface, wherein a material of the panel is non-transmissive to light;

a pattern of microscopic holes drilled through at least a portion of the panel, wherein openings of the microscopic holes are sized such that light applied to the second external surface illuminates the pattern on the first external surface and the first external surface forms a continuous panel surface to the naked eye when light is not applied to the second external surface; and a light transmissive material filling the microscopic holes.

2. The apparatus of claim 1 wherein the panel forms portion of a housing, the apparatus further comprising:

a light source located within the housing and located so as to transmit light into openings of the microscopic holes opposite from the first external surface.

3. The apparatus of claim 1 wherein each of the microscopic holes is conically-shaped with a smaller opening at the first external surface than at the second external surface.

4. The apparatus of claim 3 wherein a diameter of each of the microscopic holes at the first external surface is about 30 µm.

5. The apparatus of claim 3 wherein a diameter of each of the microscopic holes at the second external surface is about 50-90 µm.

6. The apparatus of claim 1 wherein the light transmissive material is a cured polymer.

7. The apparatus of claim 1 wherein each of the microscopic holes is substantially conical, a diameter of a smaller end of each conical hole is between about 10 and 50 µm and a diameter of a larger end of each conical hole is between about 60 and 200 µm.

8. The apparatus of claim 1 wherein the panel comprises anodized aluminum.

9. The apparatus of claim 1 wherein the pattern comprises one of a message or an image.

* * * * *